Nov. 24, 1925.

T. CARROLL

CASH REGISTER

Filed Dec. 8, 1919

Inventor
THOMAS CARROLL
by Earl Bent
Henry E. Stauffer
Attorneys

Nov. 24, 1925.

T. CARROLL

CASH REGISTER

Filed Dec. 8, 1919

Inventor
THOMAS CARROLL

Patented Nov. 24, 1925.

1,562,686

UNITED STATES PATENT OFFICE.

THOMAS CARROLL, OF DAYTON, OHIO, ASSIGNOR TO THE NATIONAL CASH REGISTER COMPANY, OF DAYTON, OHIO.

CASH REGISTER.

Application filed December 8, 1919. Serial No. 343,395.

*To all whom it may concern:*

Be it known that I, THOMAS CARROLL, a citizen of the United States, residing at Dayton, in the county of Montgomery and State of Ohio, have invented certain new and useful Improvements in Cash Registers, of which I declare the following to be a full, clear, and exact description.

This invention relates to improvements in cash registers, and has more particular relation to the type of cash registers shown and described in Letters Patent of the United States issued to Thomas Carney May 23, 1893, No. 497,860, and also in the United States Letters Patent to Joseph P. Cleal, No. 718,565, issued January 13, 1903.

In its general construction and operation, the machine shown in the present application is substantially like that shown in the Carney and Cleal patents.

The object of the present invention is to enable a proprietor of a store selling taxable goods to keep an account of the sale of all goods upon which there is placed a Government tax, and also to keep account of the tax itself collectable on such goods.

In the accomplishment of this object the machine is constructed to enable the proprietor to register simultaneously upon separate totalizers both the amount of a purchase and the amount of tax to be applied thereto.

It is a further object of the machine to provide not only for the registration of the amount of the purchase and the amount of the tax assessable on the purchase, but also to make a printed record of both the amount of the tax and the amount of the purchase, and to indicate both of the said amounts.

As it frequently occurs that a sale of goods on which no tax is assessed is to be handled by the same cash register as that which handles the sales of taxable goods, the machine is so constructed as to enable the proprietor to make a record of the sale of non-taxable goods, and also to indicate the fact that no tax has been registered in connection with that sale.

With these and incidental objects in view, the invention consists in certain novel features of construction and combinations of parts, the essential elements of which are set forth in appended claims, and a preferred form of embodiment of which is hereinafter described with reference to the drawings, which accompany and form part of this invention.

Of said drawings:—

The machine in general includes several banks of depressible amount or purchase keys, a key representing a "No tax" transaction, and another key representing a "No sale" transaction. The operation of the machine in a sale of taxable goods is effected by depressing only the keys representing the amount of the purchase, which enters the amount of the sale upon the purchase totalizer and also the amount of the tax on the tax totalizer. The operation in a sale of goods upon which there is no tax requires an initial depression of the "No tax" key, followed by the depression of the proper purchase keys; and the operation of the purchase keys will, through mechanism common to the "No tax" key and purchase keys, effect the complete operation of not only the purchase keys but the "No tax" key, which has been initially operated.

The opening of the cash drawer at times other than when a purchase is to be registered, is effected by depression of the "No sale" key.

When registering the purchase of goods which are non-taxable, the initial depression of the "No tax" key affects the operating mechanism of the tax totalizer so that no amount will be entered in that totalizer, but the amount of the purchase will be entered in the purchase totalizer.

The indicators differ from the usual indicators provided for this type of machine, in that they have, in addition to the numerals representing the amount of the purchase, numerals representing the tax on the purchase and also the word "Tax".

Figures 4, 5, 6, 7, 8, 9, 10, 11:
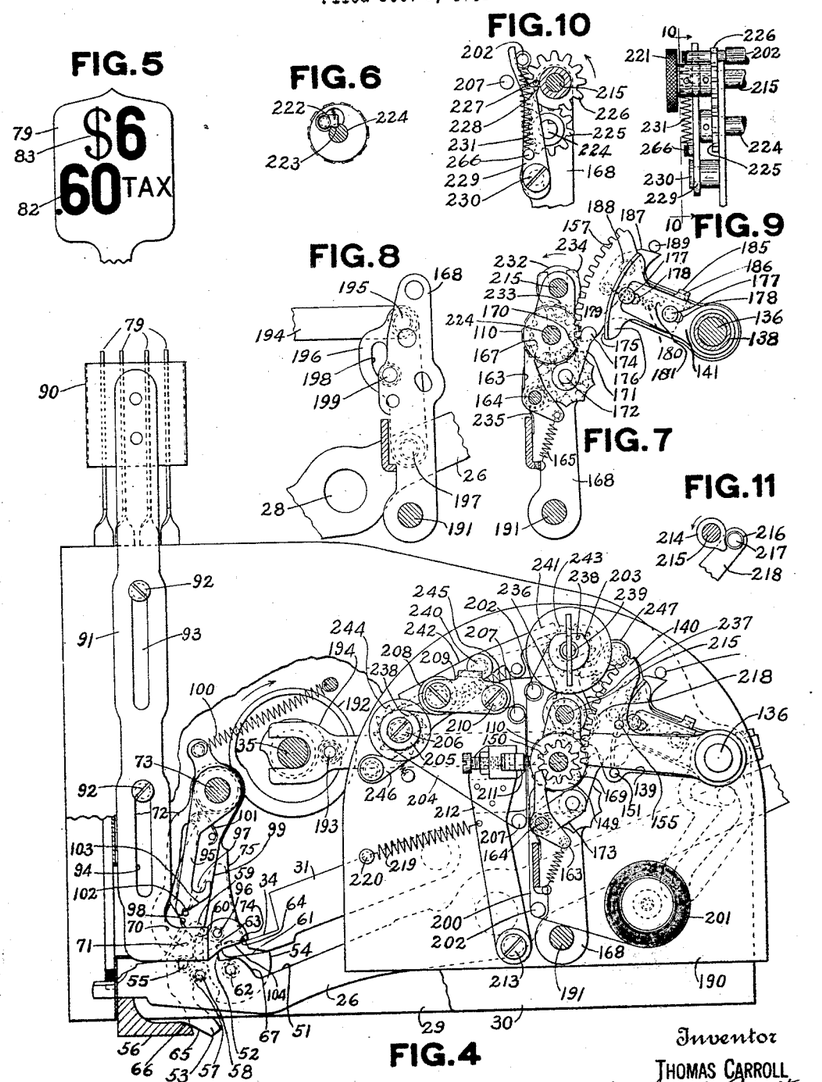
Fig. 4 is an elevation of the tax recording mechanism, with a portion of the left side frame of the machine removed to clearly show some of the parts inside of the machine.
Fig. 5 is a detail view of one of the indicators.
Fig. 6 is a detail view of a tax totalizer printing wheel.
Fig. 7 is a detail sectional view of the tax totalizer, taken on the line 7—7 of Fig. 1, looking in the direction of the arrows.
Fig. 8 is a detail view of the tax totalizer frame showing its operative connections.
Fig. 9 is a detail rear elevation of the tax totalizer reset mechanism.
Fig. 10 is a detail sectional view on the line 10—10 of Fig. 9, looking in the direction of the arrows.
Fig. 11 is a detail view of the cam and a portion of the arm for operating the tax printing platen.

Simultaneously with the registration of the amounts on the totalizers, a printing of the purchase amount upon a record strip is effected by a printing mechanism, not shown herein, attached to the right side of the machine; such for instance, as that shown in the patent to Carney No. 699,100, granted April 29, 1902. A record of the total amount accumulated upon the tax totalizer is effected by manually turning a knob, which operates a printing mechanism located on the left side of the machine (Figs. 1 and 9).

Figure 1:
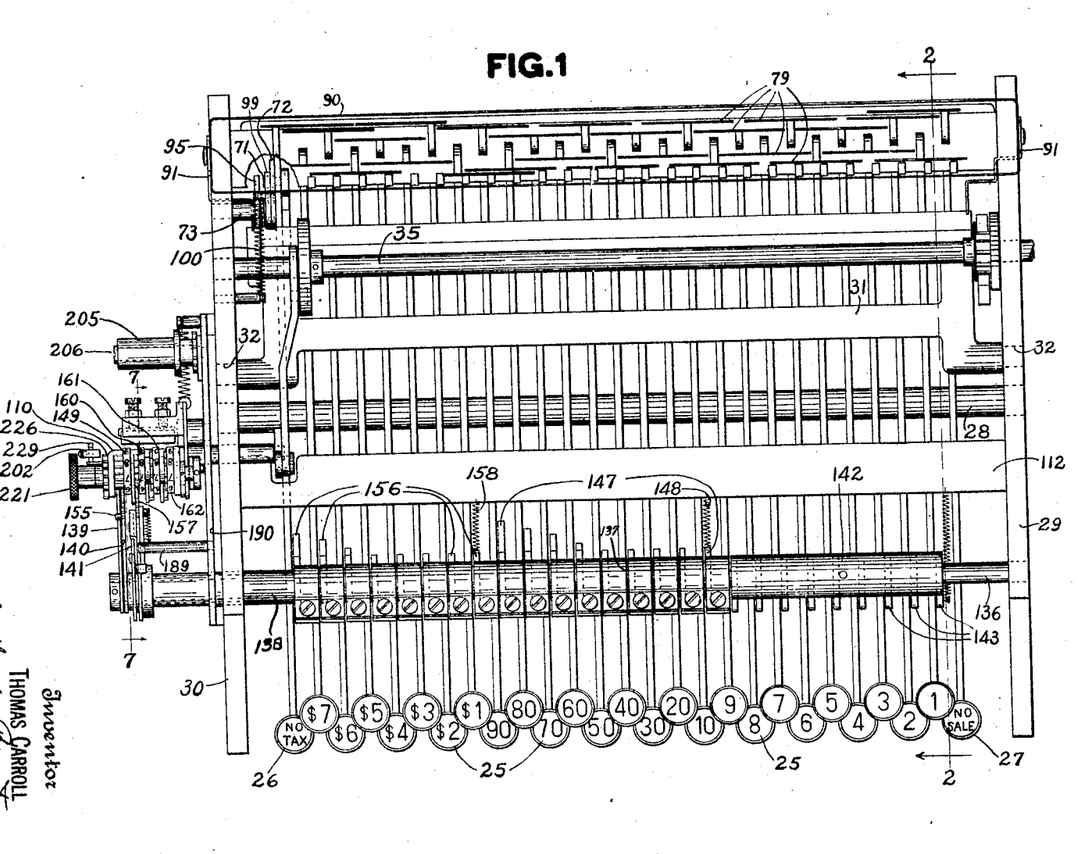
Fig. 1 is a partial plan view of the type of machine shown in said patents to Cleal and Carney.

The machine is provided with a series of amount or purchase keys 25, a "No tax" key 26, and a "No sale" key 27 (Fig. 1). All of the keys 25, 26 and 27 are pivotally mounted upon a transverse rod 28 (Figs. 2 and 3), supported in side frames 29 and 30. Common to all of the keys is a key coupler 31 of a form well known in the art, and fully described in the aforesaid patents to Carney and Cleal. The key coupler is pivoted at 32 at each end in the side frames 29 and 30, and normally rests on the rear ends of the purchase keys 25 and "No sale" key 27. Each of the purchase keys 25, and the "No sale" key 27, is provided with a notch 33 (Fig. 2), which cooperates with the lip 34, formed on the rear edge of the key coupler 31.

Figures 2, 3, 14:
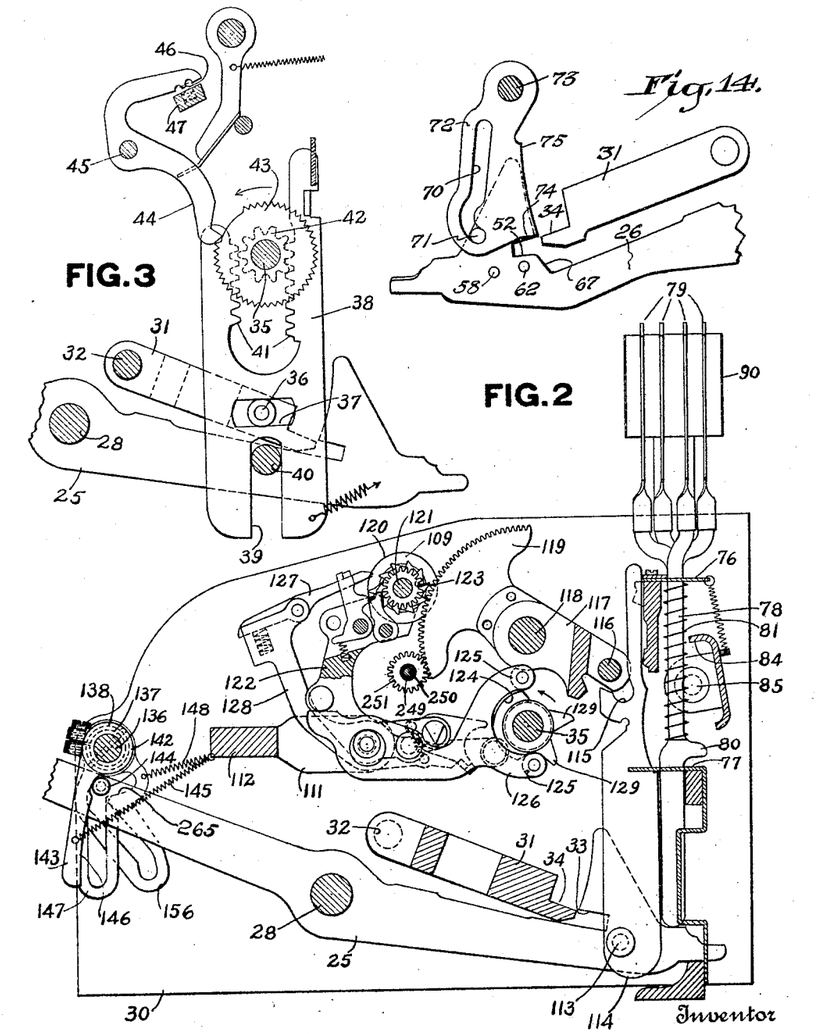
Fig. 2 is a transverse sectional view taken on the line 2—2 of Fig. 1, looking in the direction of the arrows.
Fig. 3 is a detail section partly broken away of the mechanism for rotating the common operating shaft.
Fig. 14 is a detail view of the mechanism for preventing the simultaneous depression of the "No tax" key and the "Purchase" and "No sale" keys.

Suitably mounted in the side frames 29 and 30 is a transverse rotary shaft 35, which is adapted to be given a complete rotation, by the mechanism shown in detail in Fig. 3, upon each reciprocation of the key coupler 31. By referring to said figure, it will be noted that at its right hand end the coupler 31 is provided with a stud 36, which projects into an elongated slot 37, formed in the vertical reciprocable double rack 38. This rack 38 at its lower end is provided with an open slot 39, to receive stud 40, carried by the right hand side frame 29. At its upper end, the rack 38 is also slotted, and the inside walls thereof are provided with oppositely arranged rack teeth 41, which cooperate with a pinion 42 fast on the rotary shaft 35. This mechanism is substantially the same in construction and operation as that shown in the aforesaid Carney and Cleal patents for giving a complete rotation to the shaft 35 at each reciprocation of the key coupler 31, the rotation being in the direction of the arrow (Figs. 2, 3 and 4). In order to prevent a retrograde movement of the shaft 35, a ratchet or full stroke disk 43 is secured to the right hand end of the shaft 35, and cooperates with a pivoted full stroke pawl or lever 44, pivoted at 45 to the frame of the machine, and held in engagement with the ratchet 43 by a spring 46 mounted in a lug 47 on the right hand side frame 29.

It will thus be seen that, upon each depression of a purchase key 25 or a "No sale" key 27, the key coupler 31 will be reciprocated, and through the connections shown in Fig. 3, and above described, a complete single rotation will be given to the shaft 35. The function of the key coupler 31, as is well known in the art, is to permit the starting of two keys; for example, the dollar key and the twenty-cent key, and the completion of the operation by depressing either one of the two keys alone. By reason of the engagement of the lip 34 of the key coupler with the notches 33 in the keys both the dollar key and the twenty-cent key will be fully operated by the complete depression of either one of the keys alone.

*No tax key.*

The "No tax" key 26 is of different construction from the keys 25 and 27. The construction of this key is substantially that shown in U. S. Letters Patent to Von Pein, No. 1,371,653, issued March 15, 1921.

The key 26 is of the construction shown in Fig. 4. It will be noted that this key is cut-away as at 51, so that when the key coupler 31 is resting on the keys 25 and 27, as shown in Fig. 2, it will not be resting on the key 26. But the key is provided with a notch 52 for cooperation with the lip 34 of the key coupler 31 in the same manner as the notches 33 of the keys 25 and 27 cooperate with said lip 34, as hereinbefore described.

The cut-away portion 51 permits the key 26 to be given an initial depression independent of any movement of the key coupler 31. This initial depression is for the purpose of disabling the "Tax" totalizer and obscuring the "Tax" indication, in a manner to be hereinafter described, so that in a no tax transaction, the tax totalizer will not be operated.

This key has pivotally mounted near its rear end a pair of pawls 53 and 54. This construction constitutes a so-called "flexible" key and is substantially like the construction shown in the Von Pein patent referred to. The normal position of the pawls 53 and 54 may be substantially that shown in Fig. 4, wherein it will be seen that the pawl 53, which is pivoted at 55, is normally held against a portion 56 of the stationary frame by a spring 57 interposed between the lower end of the pawl and a stud 58 carried by the key 26. At its upper end the pawl 53 is provided with a hook 59, adapted to cooperate under certain conditions with a locking point 60 of the pawl 54, as will be hereinafter described. When the key 26 is depressed, the rear end will be elevated, and as the pawl 53 passes clear of the stationary portion 56 of the frame, the spring 57 will force the lower end of the pawl rearwardly so that it stands above the frame portion 56. When the pressure on the forward end of the key is removed, the pawl 53 engaging with the frame portion 56 will hold the rear end of the key elevated and the front end depressed. As the rear end of the depressed key moves upward, the face 61 of the pawl 54 will strike the underside of the lip 34 of the key coupler 31 and during the continued operation of the key the pawl 54 will be rocked clockwise around its pivot 62, carrying the point 60 away from the hook 59 of the pawl 53 and bringing a face 63 across the notch 52 in the depressed key.

This initial depression of the key 26 will cause the point 64 which is at the outer end of the notch 52 to cross the arc of movement of the rear edge of the lip 34 of the key coupler 31. Consequently, when the key coupler is rocked clockwise about its pivots 32 by the depression of a key 25 or 27, the lip 34 will engage the point 64 at the outer end of the notch 52 of the key 26, and the rear end of the partially depressed key 26 will be carried upward with the key coupler 31, thereby completing the operation of the previously partially depressed key.

As this operation takes place, the lip 34 enters the notch 52 of the key 26 and engages the face 63 of the pawl 54, rocking the same counter-clockwise on its pivot 62 (Fig. 4), until the point 60 of the pawl 54 is brought into position to be engaged by the hook 59 of the pawl 53. The spring 57 will then rock the pawl 53 in a clockwise direction, causing the hook 59 to lock over the point 60 of the pawl 54. This will hold the face 61 of the pawl 54 rigid against the underside of the lip 34 of the key coupler 31.

When the keys have completed their movement in one direction, the pressure is released and, by reason of the weight of the key coupler 31, the rear ends of the depressed keys are moved downward toward normal position. As the coupler rests on the keys 25 and 27, this downward movement will be applied directly to these keys; but as the cut-away portion 51 of the key 26 does not permit of the coupler contacting directly with said key, the lip of the coupler rests on the face 61 of the pawl 54, and by this means will restore the key 26 to normal position. As the key 26 approaches its normal position, the beveled rear face 65 of the pawl 53 will engage the curved forward edge 66 of the frame portion 56, and the pawl will thus be rocked counter-clockwise about its pivot 55, thereby disengaging the hook 59 from the point 60 of the pawl 54; the parts then again assume the position shown in Fig. 4.

It will be noted that when the key 26 has been partially depressed, a wall 67 at the rear end of the cut-away portion 51 will engage the rear edge of the lip 34; and because of the intersecting paths of movement of the keys and coupler, the raising of the rear edge of the coupler 31 by key 26 is prevented.

Means is provided to prevent a simultaneous depression of the "No tax" key 26 and the purchase keys 25 and "No sale" key 27. In the rear end of key 26 and projecting to the left is a pin 71 (Figs. 1, 4 and 14) engaging with a slot 70 in an arm 72 (Figs. 4 and 14). The slot is so formed that a very slight movement of the key will cause the arm 72 to swing in a counter-clockwise direction around its supporting pivot 73, projecting from the side frame 30. This brings the point 74 of the plate 72 over the top of the lip 34 of the key coupler 31; and as the key coupler rests upon the keys 25 and 27 they will be locked against operation. The slot 70 in the arm 72 is so formed as to return the arm 72 to its normal position when the key 26 has received its full initial movement. Keys 25 or key 27 can then be depressed.

Should the keys 25 or 27 be depressed before the key 26, the key 26 will be locked against operation by the end of the lip 34 of the key coupler 31 passing along the edge 75 of the arm 72. This prevents any movement of the pin 71 in the slot 70, thereby preventing motion of the key 26.

*Indicating mechanism.*

Slidably mounted in the frame plates 76 and 77 (Fig. 2) just above the rear end of each of the keys 25 and 26 and 27 is an indicator rod 78, which carries at its upper end an indicator tablet 79 of the type fully shown and described in the hereinbefore mentioned Carney and Cleal patents. These rods 78 are held in their lowermost position by springs 81, so that the lower ends of all of the indicator rods are in contact with the rear ends of the keys 25, 26 and 27. Each of the indicator tablets 79 bears special characters which are preferably identical with the characters appearing on the forward ends of their appropriate keys 25, 26 and 27. The indicator tablets for the keys 25 have, in addition to the above mentioned characters, other characters representing the amount of the tax called for by the value of the purchase. These tax characters 82 (Fig. 5) are placed just below the purchase characters 83, and for the purpose of distinction have to their right the word "Tax".

When any of the keys are depressed the indicator rods 78 will be elevated against the tension of the springs 81, carrying the tablets 79 upward until the projections 80 carried thereby pass above the bail 84, pivoted to rock at 85 at each end to the side frames 29 and 30. The construction and operation of this bail are old and well known in the art, and will not be described in detail here. Its purpose is to hold the indicator rods 78 appropriate to the depressed keys in elevated position between operations of the machine so as to sustain an indication between the operations, thereby showing which keys were depressed in the previous operation. It will thus be seen that when any one of the keys 25, 26 and 27 is depressed the proper indicator tablet 79 will be raised and publicly exposed through sight openings in the cabinet, which are commonly provided in cash registers, so as to indicate which of the keys 25, 26 and 27 has been operated and the amount of the purchase as well as the amount of the tax.

Referring to Fig. 5, it will be seen that as the indicator tablets contain the characters representing both the purchase amount and the tax amount, it will be necessary to obscure from view the latter when a purchase is recorded which does not call for a tax. This is done by a flash 90 (Fig. 4), which is supported by vertical rods 91, one at each end. These rods are provided with slots 93 and 94; and screws 92, fast in the side frames 29 and 30, and which pass therethrough, secure the rods to the side frames in such a manner that they may be raised and lowered during the operation of any of the keys 25 and 27. When a taxable transaction is registered, the flash 90 is raised by means of the lip 34 of the coupler bar 31 contacting with the overlapping projection 104 of the left hand bar 91. It is thus raised with the coupler and returns by gravity when the bar is restored. This action is old and well known and need not be further described. But when the "No tax" key is depressed it is desired to retain the flash 90 in an intermediate position obscuring from view the tax characters 82 (Fig. 5). To accomplish this, a latch member 95 (Fig. 4), pivoted upon the stub shaft 73, is caused to swing in a counterclockwise direction to a position to permit the pin 96, fast in the bar 91 on the left hand end of the machine, to enter the slot 97 on its downward travel, and thereby hold the flash 90 at a height to hide from view the tax characters 82 above mentioned. The latch 95 is placed in the latching position by the pin 71 mounted in the rear end of the "No tax" key 26, and contacting the angle face 98 of a lever 99 pivoted on the stub shaft 73 and held in contact with the pin 71 by a spring 100 attached to its upper end. The latch 95 is caused to move with the lever 99 by a torsion spring 101 holding the latch 95 against a pin 102 carried in the lower end of the lever 99. The latch member 95 being placed in its forward position before the rod 91, carrying the pin 96, is raised, it is necessary that the latch 95 be spring controlled, so as to permit the pin 96 in coming in contact with the angle face 103 of the latch 95 to force said latch in a clockwise direction in passing to a point above the slot 97.

When a taxable purchase follows a nontaxable purchase, it is necessary to return the flash 90 to its normal position, as shown in Fig. 4. As the point 104 of the flash rod 91 overlaps the lip 34 of the key coupler 31, said key coupler will on its upper travel contact the point 104 of the rod 91 and raise it to its full height. In so doing the pin 96 will leave the slot 97 in the latch 95 and by the tension of the spring 100, the lever 99 and latch 95 will return to their normal position, as shown in Fig. 4, in which position the flash can return to its normal position.

*Totalizers.*

As before stated, the machine is provided with two totalizers, which will be hereafter referred to as the "Purchase" totalizer and the "Tax" totalizer, respectively.

The "Purchase" totalizer is shown herein only in Fig. 2. Its construction and operation are identical with the totalizers shown in the patents to Carney and Cleal, before referred to; and no detail description thereof is, therefore, necessary. Reference will, however, be made to the parts appearing in Fig. 2, which is a section on the line 2—2 of Fig. 1, and shows the totalizer and the mechanism for actuating the cents wheel thereof. Pivoted to the keys 25 at the point 113 are members 114, only one of which is shown, having recesses 115 located at varying heights, as shown in the patents to Carney and Cleal, referred to. The members 114 engage the rod 116 of the frame 117, mounted to oscillate on the rod 118. The frame 117 carries the gear segment 119 for actuating the cents wheel of the register. The number wheels 120 are mounted on a shaft 121, carried by a frame 122, and have gears 123 secured thereto for engagement with the segment 119. The totalizer is thrown into and out of engagement with the gear segments by a cam 124 on shaft 35 which co-acts with cam rolls 125 on an arm 126 which actuates the frame. The parts are so adjusted that the pinions of the totalizers are engaged with the gear segments before the latter begin to move and continue in this position during the entire down stroke of the keys. They are then disengaged as the gear segments return to normal position during the up stroke of the keys. Suitable transfer pawls 127 carried by levers 128, and operated by cams 129 on shaft 35 effect carrying when necessary. Both the construction of the totalizers and the carrying devices are fully disclosed in the patents to Carney and Cleal, referred to; and since they form no part of this invention, will not be further discussed herein.

*Tax totalizer.*

Journalled in the side frames 29 and 30 in the forward part of the machine just above the keys is a shaft 136 surrounded by two telescopic sleeves 137 and 138 (Figs. 1 and 2) having mounted upon their left ends segment gears 139 and 140 and an arm 141 (Figs. 1, 4 and 7), which actuate the "Tax" totalizer when the keys 25 are depressed. Fast to the shaft 136 near the right end is a sleeve 142 (Figs. 1 and 2) having downward extending fingers 143, one for each key, held in contact with anti-friction rollers 144 by a spring 145. The rollers 144 are mounted in the forward ends of the keys 25. There is a finger 143 for each of the penny keys 1 to 9 inclusive. The rear side 146 of the finger 143 is so formed that during the downward movement of any one of the penny keys 25, 1 to 9 inclusive, the anti-friction roller 144 will cause said fingers 143 to swing in a clockwise direction a distance sufficient to swing the segment gear 139 the space of one tooth, which is equal to one unit of the "Tax" totalizer. Fast on the right end of the sleeve 137 are slotted fingers 147, one for each key in the tens of cents bank, which extend downward between the tens of cents keys 25 and are held by a spring 148 in contact with anti-friction rollers 144 mounted in the forward end of said keys. The fingers 147 are graduated in order to give a variable travel to the segment 140, which will actuate the units wheel of the "Tax" totalizer an amount equal to one-tenth of the amount shown by the tens of cents "Purchase" key 25, which is depressed in recording the purchase amount. The slotted fingers 147 for the tens of cents keys are so formed as to swing the segment 140 secured to the left hand end a distance of two teeth in the segment gear when the ten cent key is depressed, and a distance of three teeth in the segment gear when the twenty-cent key is depressed, and so on for all of the tens of cents keys, the segment moving in every instance an amount which will cause registration of one cent in excess of the number represented by the tens of cents key operated. This is necessary as both the penny segment 139 and the tens of cents segment 140 actuate the same totalizer wheel 149. It can be seen in Fig. 4 that the segment gear 140 does not engage with a tooth of the units totalizer pinion 150 until after the segment 140 has travelled a distance of one tooth. In a registration which calls for the operation of a key in both the penny bank and the tens of cents bank, the amount to be recorded in the "Tax" totalizer would equal 10% of the amount shown on the operated tens of cents key in addition to the one unit to be recorded by the operation of any one of the penny keys, the machine being so constructed as to record a tax equal to one cent on every ten cents or fraction thereof. The tens of cents segment 140 (Fig. 4) has in it a pin 151, which contacts with the lower edge of the penny segment 139, so that the teeth of the penny segment 139 and the teeth of the tens of cents segment 140 are always in alignment with each other, which is necessary on account of both segments meshing with the pinion 150. By this connection between the segments 139 and 140 it can be seen that when operating a "Purchase" key 25 in the penny bank only, the tens of cents segment 140 will move with the penny segment 139; but as the first tooth of the segment 140 is in alignment with the third tooth of the segment 139 said segment 140 will not engage the pinion 150 when registering 1 by the penny bank. There is also another pin 155 mounted in the segment 140, which, after said segment 140 has had a movement equal to one tooth engages the segment 139, and during a further movement of the segment 140 the pin 155 will carry the segment 139 the remainder of its travel, or, in other words, after the segment 140 has moved one space the two segments 139 and 140 will move as one. This construction is provided to prevent the segment 139 from shifting the pinion 150 after the segment, which has only three teeth, has rotated out of engagement with the pinion, which would happen if it were not for the pin 155, the segment 139 being under constant tension of the spring 145.

Mounted on the right hand end of the sleeve 138 are slotted fingers 156 which engage with anti-friction rollers 144, mounted in the forward end of the dollar keys 1 to 7, inclusive. The slots of these fingers are graduated in a like manner to the slots in the fingers 147 of the tens of cents bank to give a variable movement to the sleeve 138, and differ only from the fingers 147 in that the finger engaging the $1.00 key will rotate the segment 157 the space of one tooth, which is freely mounted on the left hand end of the tube 138 and controlled by the arm 141 which is rigidly fast to the sleeve 138 (Fig. 7). The $2.00 key will move the segment 157 two spaces, and the $3.00 key three spaces, and so on; while in the tens of cents bank the 10¢ key moves its respective finger two spaces, which has hereinbefore been described. The slotted fingers 156 of the dollar bank are all held in contact with the anti-friction rollers 144 by the spring 158 (Fig. 1). The slotted fingers 147 and 156 are all provided with supplemental slots or recesses 265 (Fig. 2) concentric with the shaft 136, so that as these fingers are rotated under the action of any particular key, the rollers 144 of the other keys may pass into these recesses.

Referring to Fig. 1, it can be seen that the "Tax" totalizer contains four digit wheels. The wheel 149 on the left being the penny wheel, the next wheel 160 the tens of cents wheel, the third wheel 161 the dollar wheel, and the fourth wheel 162 the tens of dollars wheel. The penny wheel and tens of cents wheel are actuated by the segments 139, 140 and 157, while the dollar and tens of dollars wheels are actuated by the well known Geneva star wheel transfer and accumulate the overflow from the tens of cents wheel. The digit wheels 149, 160, 161 and 162 are held against retrograde movement by the pawls 163, which are pivoted on the rod 164 carried in the totalizer frame 168, and held in contact with the pinions 150 and 167 by the springs 165 attached to their lower ends (Figs. 4 and 7). The penny digit wheel 149 has projecting from its right side a trip pin 169 (Fig. 4), which at each rotation of said wheel 149 will engage the underside of an angle projection 170 of an arm 171 (Figs. 4 and 7), pivoted on a rod 172, which is mounted in arms 173 carried by the rod 164. The pin 169 in passing the point 170 will cause the arm 171 to swing in a clockwise direction causing its upper end 174 to come in contact with a flange 175 of a plate 176 and force said plate towards its pivot 136. The movement of said plate 176 will cause the segment gear 157 to rotate in a counterclockwise direction, the space of one tooth, which being in engagement with the pinion of the tens of cents digit wheel will cause the same to rotate one space. The plate 176 is mounted upon the arm 141 by means of studs 177 guided in slots 178 in the arm 141 and is held in its outward position by a spring 179 attached at one end to a pin 180 (Fig. 7) in the plate 176, and at the other end to a pin on the pawl 187 hereafter described. This pin 180 passes through an angled slot 181 in the segment gear 157, which when the plate 176 is caused to move toward its pivot point 136, will force the segment 157 in a counter-clockwise direction as hereinbefore described. The drawings show the "Tax" totalizer disengaged from the segment gears; this accounts for the great amount of space between the end 174 of the arm 171 and the flange 175 of the plate 176 (Fig. 4). When the totalizer is in position to be actuated by the segments, this gap is sufficiently reduced to cause the arm 171 to give the proper action to the plate 176.

When the trip pin 169 passes the point 170 of the arm 171 and forces the plate 176 towards its pivot point 136, the said plate 176 will be held in its operated position until the segment 157 returns to its normal position, by means of a lip 185 sliding by a shoulder 186 formed on the end of a spring held pawl 187 pivoted on a stud 188 mounted on the right side of the segment gear 157 (Fig. 7). Normally said pawl 187 engages a pin 189, projecting from the "Tax" totalizer plate 190, in which position the lip 185 on the plate 176 is released from the shoulder 186, on the pawl 187, thereby permitting the plate 176 to return to its normal position at the end of an operation of the machine.

The transfer of amounts from the tens of cents wheel to the dollar wheel and tens of dollar wheels is by the Geneva star wheel mechanism, which is so well known in the art that it will not be described here, but can be seen in the United States Letters Patent, granted to Thos. Carney on Jan. 22, 1895, No. 532,762, where it is described in detail.

The numerals on the digit wheels are embossed in the form of type so as to print the accumulated amounts on a record strip, as will be hereinafter described.

The "Tax" totalizer is mounted in a frame 168 pivoted on a stud 191, projecting from the totalizer plate 190 (Fig. 4). The normal position of this totalizer frame is with the pinions disengaged from the actuating segments. At the beginning of the rotation of the common driving shaft 35 the "Tax" totalizer frame is swung forward so that the pinions 150 of the digit wheels mesh with the actutaing segments. This motion is obtained by a cam 192 fast on the shaft 35 engaging a cam roller 193, which is mounted on a stud fast on a pitman 194, the forward end of said pitman being connected by a stud 195 (Fig. 8) to a link member 196, the lower end of which is pivoted on a stud 197 carried in the forward end of the "No tax" key 26. Projecting from the totalizer frame 168 and engaging with a slot 198 in the link 196, is a pin 199, which is to form a connection between the totalizer frame 168 and the link 196, and give a rocking motion to said totalizer frame, to engage and disengage the totalizer with the actuating segments.

If the purchase is non-taxable no registration will be made upon the "No tax" totalizer; therefore, it is necessary to prevent the pinions of said totalizer from engaging with the actuating segments, which being directly connected with the amount keys will automatically move every time that any of the amount keys 25 are operated. This is accomplished by the slotted link 196 being connected to the "No tax" key so that when the "No tax" key is depressed through its initial movement, the form of the slot 198 is such as to swing the "Tax" totalizer frame in a counter-clockwise direction, a distance equal to the movement given to the pitman 194 by the cam 192 during the rotation of the shaft 35. The totalizer frame having been swung toward the rear of the machine by the action of the "No tax" key will, when the driving shaft 35 is rotated, be brought to its normal position, as shown by the drawings, by the cam 192, in which position it is disengaged from the actuating segments. When registering a taxable purchase, the cam 192 is so timed as to immediately engage the "Tax" totalizer with the actuating segments at the beginning of the downward movement of the keys 25 and to disengage said totalizer from the actuating segments at the beginning of the return movement of the keys 25.

At any period when it is desired to take a statement from the "Tax" totalizer a record is printed upon a record strip 200, which is fed from a supply roll 201, around guide studs 202 and on to a receiving roll 203. This record strip passes by the totalizer wheels between the type block and a continuous inking ribbon 204, which is guided by a feed roller 205, mounted on a stud 206 projecting from the totalizer plate 190, and studs 207, and held taut by a roller 208, carried in the frame 209, pivoted on a stud 210 mounted in the totalizer plate 190. This inking ribbon is given a slight movement each time a statement is printed from the "Tax" totalizer by mechanism which will hereinafter be described. A platen 211 carried in the upper end of an arm 212, which is pivoted on the stud 213, mounted in the totalizer plate 190, will be brought in contact with the type carried on the "Tax" totalizer wheels to cause an impression to be made upon the record strip. A swinging motion is given to the platen arm 212 by a cam 214 (Fig. 11) secured to a shaft 215 and rotating in a counter-clockwise direction, engaging with a cam roller 216 mounted on the stud 217 in the upper end of an arm 218, which is fast at its lower end to the platen arm 212. The platen arm 212 is held in contact with said cam 214 by a spring 219, one end of which is attached to the arm 212, and the other end to a pin 220 projecting from the totalizer plate 190. The rotation of the shaft 215 is caused by the turning of a knob 221 (Fig. 9) in a counter-clockwise direction when it is desired to print a statement of the "Tax" totalizer upon the record strip. Said knob 221 being pinned to the shaft 215 will, when turned a complete revolution in a counter-clockwise direction, also set all the digit wheels of the "Tax" totalizer to their normal or zero position after the record has been made upon the record strip. Each of the digit wheels of the "Tax" totalizer has mounted in a recessed space in the side of the wheel, as shown in Fig. 6, a spring pressed pawl 222, which engages with a groove 223 in a shaft 224 upon which they are freely mounted. Fast on the left end of shaft 224 (Fig. 9) is a mutilated pinion 225 (see also Fig. 10) which meshes with a gear 226 fast on the shaft 215. Said gears 225 and 226 are mutilated so that the shaft 215 will rotate a sufficient distance before the gear 226 will cause rotation of the gear 225, to give sufficient time to operate the platen arm 212 to make its impression of the type upon the record strip before returning the digit wheels to their zero or normal position. A pin 227 projecting from the side of the gear 226 (Fig. 10) rests upon a ledge 228 of a pawl 229 which acts as a stop after the knob 221 has made a complete revolution. The drawing shows the ledge 228 of the pawl 229 engaging the underside of the pin 227, which is a condition existing after the knob 221 has been rotated to set the "Tax" totalizer to zero position. During the first part of an operation of any of the keys 25 and 27, as the totalizer frame is swung forward, the pin 227 is moved away from the pawl 229 which is held against movement in a forward direction by the guide stud 202. The lower end of the pawl 229 having an elongated slot engaging a stud 230 and being under the tension of a spring 231, one end of which is attached to the stud 202 and the other end attached to a pin 266 mounted in said pawl 229, will move upward a sufficient distance for the ledge 228 to be out of the path of the pin 227, so that the knob 221 can be turned, as hereinbefore described.

When resetting the "Tax" totalizer wheels to their zero position it is necessary to disengage the Geneva star wheel transfer from the totalizer wheels. This is accomplished by a cam 232 (Fig. 7) fixed to the shaft 215 engaging with a cam roller 233 carried on a stud mounted on a pitman 234, the lower end of said pitman being pivoted on the rod 172. The cam roller 233 is held in engagement with the cam 232 by a torsion spring 235 encircling the rod 164 and one end resting against the totalizer frame 168, and the other end engaging the underside of the rod 172. In addition to the spring 235 holding the cam roller 233 in engagement with the cam 232 it holds the Geneva star wheel transfer in its engaged position.

The feeding of the record strip 200 from the supply roll 201 to the receiving roll 203, and also the feeding of the inking ribbon 204, occurs each time the knurled knob 221 is given a rotation. Projecting from the rear side of the cam 232 is a pin 236, (Fig. 4) which engages with an opening in a plate 237 and gives a reciprocating motion to said plate. Both ends of the plate 237 have elongated slots 238, which guide said plate on the studs 206 and 239. Freely mounted upon a stud 240, which is fast in the plate 237, are pawls 241 and 242, which engage with ratchet wheels 243 and 244, respectively. The pawls 241 and 242 are connected together by a spring 245, which holds the pawls 241 and 242 always in contact with the ratchets 243 and 244. The ratchet 243 is secured to the record strip receiving roll 203, and causes the same to rotate in a clockwise direction through the action of the pawl 241; and the ratchet 244 is secured to the inking ribbon feed roll 205, and causes the same to rotate in a counter-clockwise direction by the action of the pawl 242. The ratchet is prevented from a retrograde motion by the spring controlled pawl 246; and the ratchet 243 is prevented from retrograde motion by the spring controlled pawl 247.

It will thus be seen that upon the operation of any one or more of the "Purchase" key 25, in addition to the amount of the purchase being entered upon the "Purchase" totalizer, the amount of the tax will be entered upon the "Tax" totalizer, so that the "Tax" totalizer will show the total amount of tax which is recorded in the machine. At the same time the indicator tablet 79 appropriate to the keys 25 will be elevated to indicate both the amount of the purchase and the amount of the tax which is registered for each taxable purchase.

*Printing mechanism.*

Referring to Fig. 2, it will be seen that the "Purchase" totalizer actuating segment 119 meshes with a pinion 251 which is secured on a sleeve 249 concentric with another sleeve and a rod 250 upon which pinions meshing with the actuators for the dimes and dollars keys are mounted. These sleeves and rod extend to the right and through the frame 29 to a printing mechanism, which prints the amount of the purchase upon a detail record strip retained in the machine. This printing mechanism and the connections for operating same are not disclosed herein, but are fully described in the aforesaid patent to Cleal, to which reference is made for a full understanding thereof.

*Modified indicator.*

Figure 12:
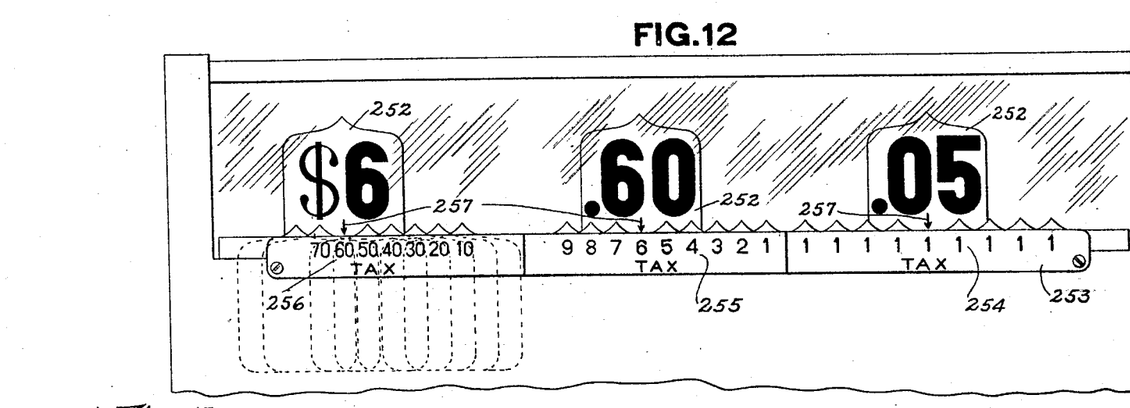
Fig. 12 is a detail view of a modified form of tax indicator.

A modified form of indicating means for displaying the amount of the tax in connection with the purchase is shown in Fig. 12. The indicator tablets 252 here illustrated are of standard form. Placed beneath the "Purchase" indicators 252, and fastened to the front of the cabinet enclosing the machine, is a plate 253, which contains numerals representing the tax amount for each of the "Purchase" indicator tablets 252. These tax numerals are arranged in three groups, the one on the right 254 representing the tax for the penny bank, 1 to 9 inclusive; the center group 255 represents the tax for the tens of cents bank, 10 to 90 inclusive; and the group 256 on the left represents the tax for the dollar bank, 1 to 7 inclusive. The arrow 257, which is on each of the indicator tablets 252, points to the tax amount appropriate to the "Purchase" indicator then being displayed. In computing the tax on a purchase, say of $6.65, which is the amount shown in Fig. 12, the numerals in the different groups to which the arrows point are added together, and the sum 67¢, represents the tax on the purchase, which is one cent on each 10¢ or fraction thereof. When this form of tax indicator is used, the flash 90 must be operated in the usual manner, and the mechanism heretofore described for holding the same partially elevated to conceal the tax indication on the tablets when the "No tax" key is operated would be omitted.

*Modified purchase key.*

Figures 13, 15, 16:
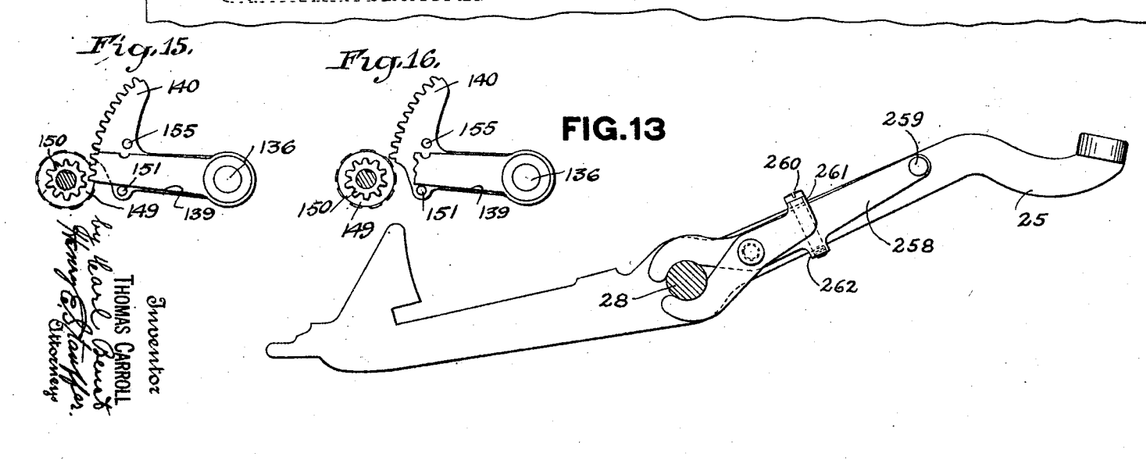
Fig. 13 is a detail view of a modified form of a registering key.
Fig. 15 is a detail side elevation of the units totalizer wheel and the pair of actuators which cooperate therewith.
Fig. 16 is a duplicate of Fig. 15 with the exception that the auxiliary actuator is broken away to expose the principal actuator to view.

Fig. 13 shows a modified form of "Purchase" key. The key proper 25 is the standard key for machines of this type. Mounted thereon is an attachment having in its forward end a pin 259, which performs the same function as the roller 144 shown in Fig. 2, and previously described. The object of this key attachment is to make it possible to change a regular machine to a tax machine without removing the keys 25 to apply the roller 144. The attachment 258 clamps around the common shaft 28 and is held in position by a screw 260 which lies on the far side of the key 25, forming a connection between the formed lips 261 and 262 of the attachment.

*General operation.*

A general statement of the operation of the machine will now be given. Suppose for instance, that the machine is used at a soda fountain, where a tax of 1¢ is assessed for each 10¢ purchase or fraction thereof. Taking as an example the purchase of a 5¢ soda, the operator will operate the machine in the usual manner by pressing the 5¢ key which will properly register five cents, the amount of the purchase upon the "Purchase" totalizer. The "Tax" totalizer will simultaneously be operated and one cent, the amount of the tax, will be added on the "Tax" totalizer. At the same time the indicator appropriate to the 5¢ purchase key will be elevated and publicly expose the amount of the purchase together with the amount of the tax. Also the printing elements will be adjusted to print five cents upon the detail record strip of the regular printer (not shown herein but shown in the patent to Cleal, before referred to). Whenever it is desired to know the amount accumulated upon the "Tax" totalizer, the knurled knob 221, located on the left side of the machine, is given a complete revolution in a counterclockwise direction, and by so doing, a statement of the amount shown on the "Tax" totalizer wheels is printed upon the record strip 200.

If a sale is made of goods which is not taxable, the operator will first press the "No tax" key, which will so change the tax totalizer mechanism, that when the purchase keys 25 are pressed, no amount will be entered in the "Tax" totalizer. At the same time mechanism will be brought into action which will retain the indicator flash 90 in a position to hide from view the tax numerals appearing on the lower part of the indicator tablets 79, which are elevated by the purchase keys depressed.

On a "No sale" transaction, the "No sale" key only is depressed. This results in an indication of "No sale." No registration is made on either of the two totalizers, and a printed entry of zeros is made upon the detail record strip of the regular printer referred to above.

While the form of mechanism herein shown and described, is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:—

1. In a machine of the class described, the combination of a plurality of totalizers, independent actuating means for each totalizer, item entering means, and independent means actuated by the item entering means for operating the various actuating means.

2. In a machine of the class described, the combination of a plurality of totalizers, independent actuating means for each totalizer, item entering means common to the actuating means and independent means, actuated by the item entering means for simultaneously operating the various actuating means.

3. In a machine of the class described, the combination of a plurality of totalizers, separate actuating means for each totalizer, manipulative means common to the actuating means, independent means actuated by the manipulative means for operating the actuating means, and means operative at will for rendering one of the actuating means ineffective.

4. In a machine of the class described, the combination of two totalizers, independent actuating means for each totalizer, manipulative means common to the actuating means for effecting the entry of items on the totalizers, independent means actuated by the manipulative means for simultaneously operating both actuating means, and means operative at will for rendering one of the totalizers inoperative.

5. In a machine of the class described, the combination of a plurality of totalizers, manipulative means for entering data upon the totalizers, indicators carrying insignia corresponding to the data to be entered upon the respective totalizers, manipulative means for actuating the totalizers and the indicators, and means operative at will for rendering one of the totalizers inoperative, and means controlled by the last mentioned means for concealing the insignia corresponding to the totalizer rendered inoperative.

6. In a machine of the class described, a plurality of totalizers, indicating mechanism for simultaneously displaying amounts corresponding to the amounts to be entered upon the totalizers, item entering means for simultaneously operating the plurality of totalizers and indicators, and means for rendering one of the totalizers inoperative and for concealing the amounts on the indicators corresponding to the amounts which normally would have been entered upon said totalizer.

7. In a machine of the class described, the combination of a reading totalizer, a printing totalizer, means for entering amounts in said totalizers, means for rendering the printing totalizer inoperative, and means for locking the reading totalizer against operation while the printing totalizer is being moved to or from its operative position.

8. In a machine of the class described, the combination of a plurality of totalizers, means for entering amounts in said totalizers simultaneously, means operative at will for rendering one of the totalizers inoperative, and means for locking the last mentioned totalizer either in its operative or inoperative position so that it cannot be moved during the operation of the amount entering devices.

9. In a machine of the class described, the combination of a reading totalizer, a printing totalizer, means for entering amounts in said totalizers simultaneously, means operative at will for rendering the printing totalizer inoperative, and means for locking the printing totalizer either in its operative or inoperative position, so that it cannot be moved during the operation of the amount entering devices.

10. In a recording mechanism, the combination of a totalizer having a plurality of denominational elements, a plurality of amount determining means, two actuators under the control of different amount determining means and coacting with the units denominational element, one adapted to effect a single step of movement of the units denominational element and the other adapted to effect one or more steps of movement, and an actuator for each of the other denominational elements which it is necessary to operate.

11. In a machine of the class described, the combination of a totalizer having a plurality of denominational elements, two actuators for the units denominational element one adapted to effect a single step of movement and the other one or more steps of movement, an actuator for each of the other denominational elements which it is necessary to operate, a unit set of manipulative devices for operating the first mentioned actuator, a tens set of manipulative means for operating the second actuator, and other manipulative means for operating the other actuators.

12. In a transaction recording mechanism, the combination of a plurality of denominational elements, two actuators for the units element simultaneously operable one adapted to effect a single step of movement and the other one or more steps of movement, an actuator for each of the other denominational elements which it is necessary to operate, and means controlled by the units element when actuated by either the first or second actuators to effect a carry into the next higher denominational element.

13. In a transaction recording mechanism, the combination of a totalizer having a units denominational element and one or more higher denominational elements, two actuators adapted to cooperate with the units element one adapted to effect a single step movement and the other connected to the first with a loose connection so that after taking one step of movement it moves with the first mentioned actuator and causes the same to move as a part of the second actuator so as to give one or more steps of movement to the units denominational element, and an actuator for each of the other denominational elements which it is necessary to operate.

14. In a machine of the class described, the combination of a plurality of banks of manipulative devices a totalizer, actuators therefor equal in number to the banks of manipulative devices, means actuated by the units of cents bank of manipulative devices for causing one of the actuators to operate the units totalizer element a single step at every operation of any of the manipulative devices of this group, means connected to the tens of cents bank of manipulative devices for actuating the second actuator so as to operate the units denominational element one or more steps, and means connected with the units of dollars bank of manipulative devices for operating the third actuating element for operating the tens denominational element of the totalizer.

15. A machine of the class described, a totalizer, a pivotal frame therefor, actuators for the totalizer elements, item entering means for operating said actuators, a mechanism for rocking said totalizer frame so as to engage said totalizer with said actuators, and means for positioning said totalizer frame so that the totalizer will not engage with said actuators when rocked by said rocking mechanism.

16. In a machine of the class described, the combination of a plurality of totalizers, item entering levers common to said totalizers, actuators for said totalizers, means operatively connecting the levers with the actuators of one totalizer, and cam means connected to the actuators of another of said totalizers and positioned to be actuated by said levers.

17. In a machine of the class described, the combination of a plurality of totalizers, item entering levers common to said totalizers, graduated means for transmitting motion from said levers to one of said totalizers, and other graduated means for transmitting motion from said levers to another of said totalizers.

18. In a machine of the class described, the combination of a plurality of totalizers, a plurality of groups of item entering means, graduated means operated by said means for actuating one totalizer, and groups of cam means also operated by said item entering means, the members of one of said groups being identical and the members of another of said groups being graduated.

19. In a machine of the class described, the combination of a totalizer, groups of item entering means therefor, and groups of cam members operated by said item entering means for actuating said totalizer, one of said groups comprising identical members and another group comprising graduated members.

20. In a machine of the class described, the combination of a pivoted totalizer frame, a pivoted lever for moving said frame about its pivot, another pivoted lever for preventing such movement, a pitman operated by said first mentioned lever, a link connecting said pitman to said second mentioned lever, and means connecting said link to said frame.

21. In a machine of the class described, the combination of a totalizer, item entering means therefor, means operated by the item entering means for establishing a coöperative relation between the totalizer and item entering means, and manipulative means operatively connected to said second mentioned means for counteracting the effect of an operation of said second mentioned means.

In testimony whereof I affix my signature.

THOMAS CARROLL.